April 14, 1936.　　　　　L. I. DANA　　　　　2,037,679

METHOD AND APPARATUS FOR REJECTING HEAT FROM A CASCADE SYSTEM

Filed Jan. 24, 1935　　　2 Sheets-Sheet 1

INVENTOR
Leo I. Dana
BY Watson, Bristol, Johnson & Leavenworth
ATTORNEYS

April 14, 1936.  L. I. DANA  2,037,679
METHOD AND APPARATUS FOR REJECTING HEAT FROM A CASCADE SYSTEM
Filed Jan. 24, 1935  2 Sheets-Sheet 2
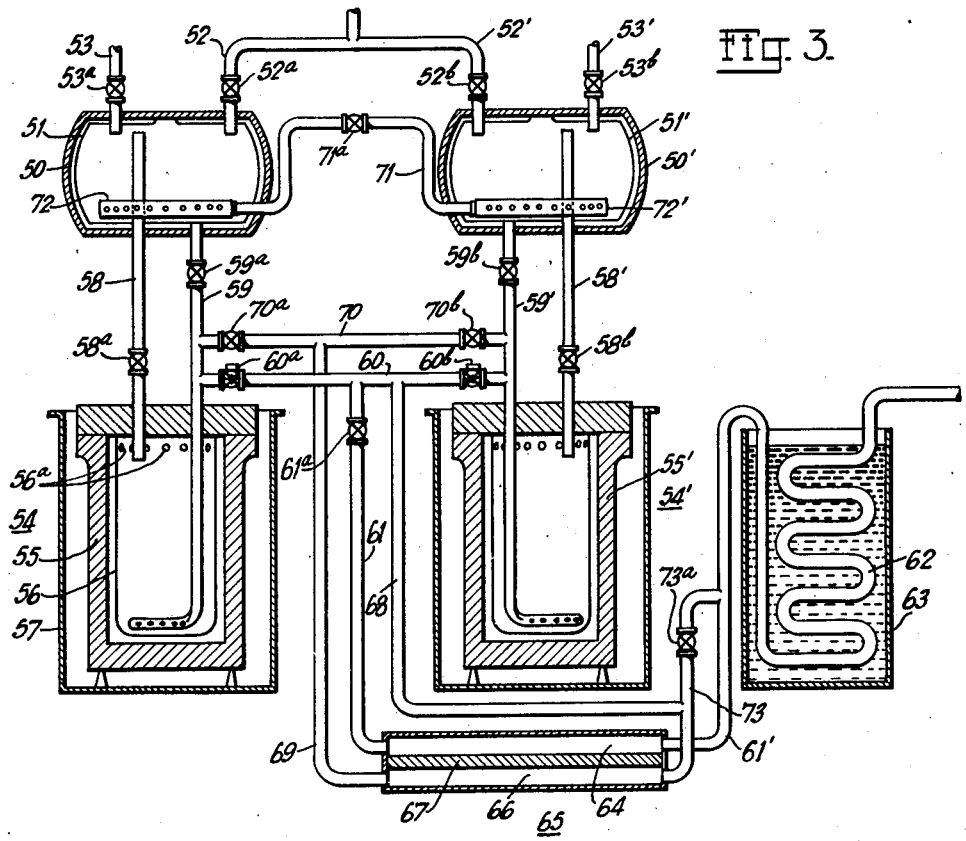
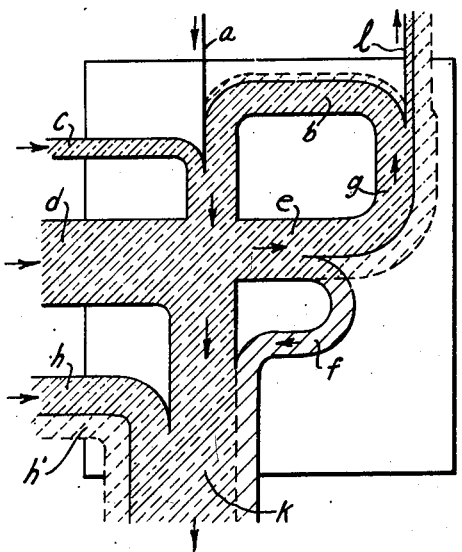
INVENTOR
Leo I. Dana
BY
Watson, Bristol, Johnson & Leavenworth
ATTORNEYS Patented Apr. 14, 1936

2,037,679

UNITED STATES PATENT OFFICE 2,037,679

METHOD AND APPARATUS FOR REJECTING HEAT FROM A CASCADE SYSTEM

Leo I. Dana, Buffalo, N. Y., assignor, by mesne assignments, to Union Carbide and Carbon Corporation, a corporation of New York Application January 24, 1935, Serial No. 3,219

22 Claims. (Cl. 62—1)

This invention relates to a method and apparatus for rejecting heat from a cascade system which is arranged for transferring a volatile material.

The invention has for its object generally an improved method for carrying away heat to reduce the internal energy of the material transferred in the gas phase to a relatively small value and the provision of suitable apparatus for carrying away heat in such manner.

More specifically, it is an object of the invention to provide a cascade system which employs transfer vessels for transferring liquids having boiling points below 273° K., such as certain liquefied hydrocarbon gases, liquid oxygen, liquid nitrogen, and the like, from regions of low pressure to regions at a higher pressure with a method and means for reducing the internal energy of the material in the gas phase to a relatively small value.

Another object of the invention is to provide a method and suitable means for utilizing the refrigeration capacity of the liquid, associated with the transfer vessels, and for storing the refrigerating effect for use in extracting heat not wanted in the system from the material in the gas phase being transferred in the system.

Another object of the invention is to provide a method and means for utilizing in greater degree than heretofore the available refrigeration or condensing capacity of the liquid passed through transfer vessels for the reduction of the internal energy of gas phase material being transferred and the rejection of said energy from the system in a manner that conserves both energy and gas material.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

Fig. 3 is a similar view showing another form of the invention applied to a cascade system having transfer vessels partly in series and partly in parallel; and Fig. 4 is an explanatory diagram.

In transferring liquefied gas from regions of low pressure to receiving devices at higher pressure by methods using transfer vessels where heat is introduced in a withdrawn portion of the material in order to effect the transfer, the gas material discharged to the receiver is at a temperature such as to provide condensing capacity while the gas remaining after discharge contains a large part of the heat that was introduced. By application of the cascade principle as set forth in copending application Serial No. 752,993, filed in the name of John J. Murphy, a desired portion of the internal energy contained in the gas phase remainder is transferred to liquid being transferred within the system. By the present invention, internal energy contained in the gas phase remainder is transferred to gas material being discharged at the desired elevated pressure from the system by taking advantage of the capacity of another body for absorbing and storing such energy. The internal energy so removed from the gas material is then usefully applied instead of being rejected with the blowdown while at the same time the quantity of the blowdown is substantially reduced.

The present invention also provides a method for utilizing the condensing capacity of gas material that is above its critical pressure for absorbing internal energy from the gas phase remainder after a discharge. In this manner, the internal energy of the material in the gas phase is substantially reduced, the refrigerating effect of the liquid within the system conserved, and the heat of the gaseous material is transferred to the material to be heated for reducing the input of heat required in the final heater.

Figure 1:
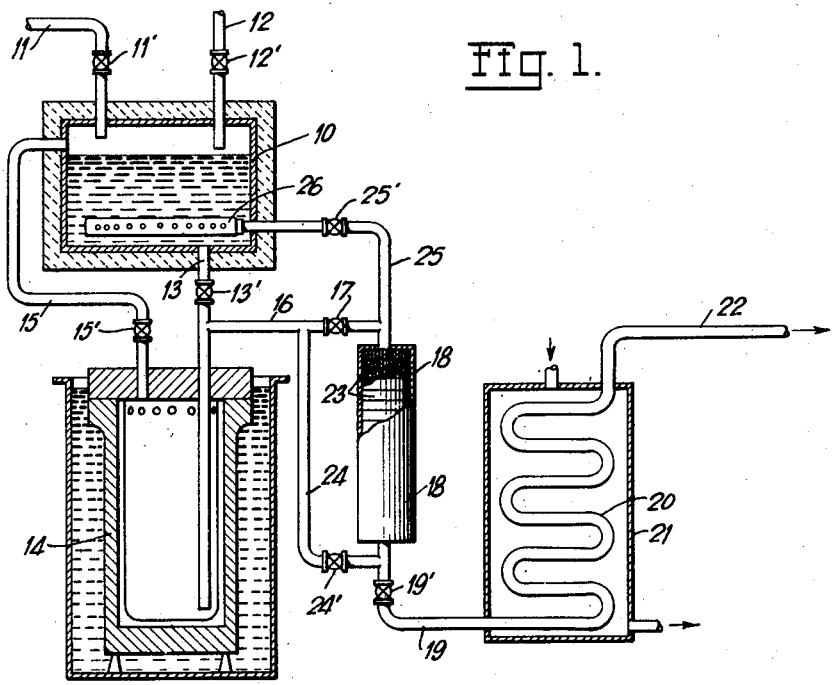
Fig. 1 is a view partly in section and partly in elevation showing a simple system of transfer vessels in cascade relation for transferring a liquefied gas, such as liquid oxygen, from a storage container to a high pressure vaporizer in accordance with the invention.

Referring now to the drawings, and particularly to Fig. 1, 10 denotes a heat insulated transfer vessel in a cascade system adapted to receive gas material in the liquid phase from a low pressure source of supply such as a transport container used in the commercial transportation of a liquefied gas, for example, liquid oxygen. A metered charge of liquid is introduced through the inlet connection 11 while the vessel is open to the atmosphere or to a low pressure receiver through the gas phase discharge connection 12. The liquid phase discharge connection 13 leads from the bottom of the vessel 10 to permit the transfer of the liquid charge to the high pressure transfer vessel 14 when the gas phase transfer connection 15 leading from the upper portion of vessel 14 is open.

Vessel 14 is of the type generally known as a "warm converter", described in Reissue Patent No. 18,476 to C. W. P. Heylandt, and is here arranged for discharging from the liquid phase. Vessel 14 accordingly has a liquid discharge connection 16 controlled by a valve 17 that leads to the cold end of an associated heat absorbing means 18, from the warm end of which a conduit 19 conducts the discharge to the final heating device here depicted as a coil 20, that is heated by a heating medium passed through the jacket 21. The device 20 has a high pressure service connection 22 leading from its upper end to consuming or gas storage devices.

The means for absorbing and storing heat, hereinafter termed a "regenerator", may be of any suitable character, such as the common passage type shown, but may also be of the separate passage type when it is desired to provide a separate and unimpeded passage for the gas material which gains the refrigeration that was transferred to the regenerator by the liquid discharged therethrough. Here the regenerator 18 is shown as containing a heat storage body in the form of foraminous material 23 that has a relatively large capacity for storing heat at the normal range of operating temperatures to which it is subjected and is so formed as to have a large heat transfer surface and substantially unrestricted fluid passages.

The gas taking up the refrigerating effect left by the liquid which passed through the regenerator 18 may be withdrawn from any suitable point of the system, for example, the gas material left in vessel 14, which gas is to be passed in contact with the liquid in vessel 10 for equalizing pressure between the vessels before dropping the liquid into vessel 14 from vessel 10. Accordingly, a connection 24 controlled by a valve 24' is shown branching from conduit 16 and leading to the warm end of regenerator 18 in order that the gaseous material may pass in a countercurrent direction through the material 23. A connection 25 controlled by a valve 25' leads from the cold end of the regenerator 18 to the gas distributor 26, here shown as disposed adjacent to the bottom of vessel 10. Valves are provided for controlling the other connections as follows: valves 11', 12', 13' and 15' which control connections 11, 12, 13 and 15, respectively.

In the cycle of events practiced in operating the cascade system shown to effect the transfer of liquefied gas, such as liquid oxygen, from a storage container to a high pressure receiving and/or vaporizing device, the liquid is transferred from the storage container first into vessel 10 where gas pressures are equalized in accordance with the cascade principle with elevation of pressure on the liquid and then transferred to vessel 14 where a further elevation of pressure ensues, due to the inflow of heat from the heating jacket of the warm converter, the liquid being substantially entirely withdrawn from vessel 14 by opening valves 17 and 19' during each cycle and passed to the receiving and vaporizing device 20. It is seen that during this withdrawal of liquid from vessel 14, the material 23 is cooled by the refrigerating effect of the liquid discharged. During the interval when no liquid is being withdrawn from vessel 14 an equalization of gas pressures with condensation of gas into liquid is effected between the vessels 10 and 14 preparatory to the dropping of another charge of liquid from vessel 10 into the vessel 14. To effect this, the valves 24' and 25' are opened and the gas at high pressure passed through the material 23 in a countercurrent direction into the vessel 10 until the pressures are equalized. The gas thus withdrawn is initially at a relatively high temperature and consequently is cooled by the material 23. By reason of this cooling effect, more gas is condensed in vessel 10 in effecting this equalization than would otherwise be the case, and the resultant equalization pressure is lower. The heat of the gas during this passage is seen to be transferred to the material 23, which heat is thereafter absorbed by the liquid then passed through the regenerator 18 and carried over into the receiving and vaporizing device 20.

Since the last portion of the gas forced from the warm converter by the expansion of gas material due to the input of heat is relatively warm, it is of advantage to by-pass around the regenerator. Therefore, when the temperature of the gas material flowing out through connection 16 has reached a value such that it begins to transfer heat to the regenerator, the valve 24' is opened and valve 17 closed so that the discharge will be completed through connections 16, 24 and 19. The refrigerating effect of the discharge is therefore conserved for use in refrigerating the gas phase remainder in the warm converter when the vessels are equalized.

Figure 2:
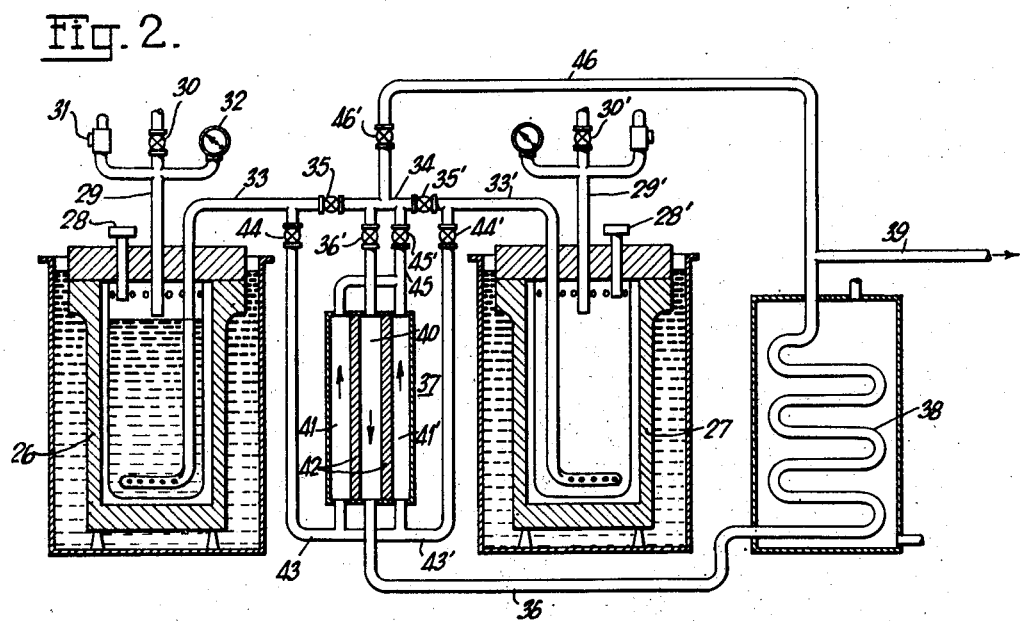
Fig. 2 is a similar view showing a modified form of the invention applied to a cascade system having vessels arranged in parallel.

In the system of Fig. 2, two warm converters are shown at 26 and 27 connected in parallel to be filled and discharged alternately. However, it is contemplated that two, three or more in parallel may be used when desired. The converters are provided with filling openings normally closed by plugs 28 and 28' and vent connections 29 and 29' which lead from a point at the desired filling level in the converters to the atmosphere and are controlled by valves 30 and 30'. Pressure relief devices 31 and pressure gauges 32 are also preferably provided and may communicate with blowdown connection 29, as shown. Discharge conduits 33 and 33' lead from the lower portion of the baskets in the warm converters and communicate externally with connection 34. They are controlled respectively by valves 35 and 35'. A conduit 36 conducts the discharge of both converters from connection 34 through a separated pass 40 of the regenerator shown generally at 37 and from thence to a heating device 38 having an exit conduit 39. The regenerator 37, while it may be of any suitable type, is shown by way of example as provided with separate passes; passages 41 and 41' being provided for the two streams of returned gas material and separated from the central pass 40 by metal walls 42 which have the desired heat storage capacity (this quality being here depicted by the relative thickness of the walls 42). The central pass 40 conducts the discharged gas material in a downward direction while the passages 41 and 41' conduct upwardly the residual gas to be cooled. The residual gas is conducted from the vessels 26 and 27 to the lower end of passages 41 and 41' by conduits 43 and 43' which are controlled by valves 44 and 44' and join discharge conduits 33 and 33', respectively. The upper ends of passages 41 and 41' communicate with connection 34 by means of connection 45 which is controlled by valve 45'. To permit the relief discharge from vessels 26 and 27 to receiving devices of gas which may have the desired pressure but whose temperature is too high for effective abstraction of heat from the regenerator, a by-pass connection 46 controlled by valve 46' is preferably provided leading from connection 34 to a suitable point in the discharge line, for example, with the exit conduit 39.

In operating this second form of apparatus, the converter 26 is filled with a charge of liquid by removing filling plug 28 and inserting snugly a filling connection after having blown down the pressure by opening blowdown valve 30; the location of the end of conduit 29 preventing overfilling. When vessel 26 is filled, gas remaining in converter 27 is conducted into converter 26 by opening valves 44', 45' and 35. The gas in flowing through the passages 33', 43', 41', 45, 34 and 33 becomes precooled by delivering heat to the walls 42 before it is partially condensed in the liquid in vessel 26. When pressures are equalized and valves 44' and 45' are closed, valve 36' is opened and discharge of gas material from converter 26 by way of central pass 40 to heating device 38 is effected.

As heat flows into the gas material in converter 26 from the warming medium in contact with its exterior wall, the pressure increases therein to a value exceeding that in heater 38 and the liquid which is at first forced out is seen to be relatively very cold but increases in temperature gradually as the discharge continues. The gas material flowing through central pass 40 picks up heat from the walls 42 and carries it out of the system. When the discharge becomes too warm it may be by-passed through connection 46. Check valves may be provided in such connection, if it is desired to insure an unidirectional flow to take place in the event that certain of the control valves are not operated at the proper time.

In the system of transfer vessels partly in series and partly in parallel shown in Fig. 3, the discharge of gas material takes place alternately from the two final vessels 54 and 54' of the warm converter variety which are disposed in cascade relation to receive charges of liquid from low pressure transfer vessels 50 and 50'. These latter are in parallel and preferably contain thin-walled inner linings or baskets, as indicated at 51 and 51', which are supported in relatively poor heat conducting relation with respect to the walls of the outer vessels. This may be accomplished by any suitable means, for example, by the interposition of thin-metal supporting spacers of low heat conductivity. The vessels 50 and 50' and their baskets are respectively arranged to be filled with charges of liquid through connections 52 and 52' and to be vented to the atmosphere by suitable means, such as connections 53 and 53'. Connection 52 has a control valve 52a; connection 52' has a similar valve 52b; connection 53 has a control valve 53a; and connection 53' has a control valve 53b.

Vessels 50 and 50' are arranged to discharge liquid respectively into the vessels 54 and 54' of the warm converter type. Each of these converters is shown as comprising an outer or pressure vessel 55, a spaced thin-walled inner vessel or basket 56, and an exterior warming means, such as a water bath 57. Gaseous communication connections 58 and 58' lead from the upper portion of vessels 50 and 50' into the top of each of the converters 54 and 54', which connections are respectively controlled by valves 58a and 58b. Connections 59 and 59' lead respectively from points at the lowest portions of baskets 51 and 51' to points near the bottoms of the baskets 56 and 56' in converters 54 and 54', which connections are controlled by valves 59a and 59b. A common discharge manifold 60 communicates with the connections 59 and 59' below valves 59a and 59b and has a common discharge connection 61 which leads to heating coils 62 that are employed for elevating the temperature of the gas material passed therethrough to a desired value. The heating coils 62 are heated by convenient means such as a bath of heating medium shown at 63. The portions of the manifold 60 which establish communication between the connections 59 and 59' and connection 61 are preferably controlled by means of check valves as shown at 60a and 60b. The check valves 60a and 60b are arranged to permit flow from either of the converters to the connection 61 when the pressures therein exceed the pressure in connection 61 and to prevent any flow in the reverse direction.

Interposed in connection 61 is one pass 64 of a regenerator shown generally at 65 which has another pass 66 separated by the heat storage agent or wall 67. The connection 61 is provided with a valve 61a controlling the portion between manifold 60 and pass 64. For effecting the countercurrent flow of gas material through pass 66, a connection 68 branching from conduit 60 to conduct gas therefrom to the warm end of the pass 66 is provided. From the cold end of this pass a conduit 69 conducts gas to a cross connection 70, that connects conduit 69 to connections 59 and 59', the communication with the latter being controlled respectively by valves 70a and 70b.

Cross-equalization of gas pressures between the vessels 50 and 50' is effected through a connection 71 controlled by valve 71a and communicating with distributors 72 and 72'. A by-pass connection 73 is also preferably provided to afford a relief discharge from conduit 68. While this by-pass may connect with the discharge line at any suitable point, it is shown as connected to the portion 61' of conduit 61 that leads to the inlet of the heating coils 62, in order to by-pass gaseous material from the regenerator when the discharge of the converters becomes too warm.

The operation of the system of vessels shown is as follows: Initially valves 53a and 52a are opened. This vents the vessel 50 to the atmosphere for the initial step in the operating cycle and admits liquid from a supply vessel accompanied by gas displacement through vent 53. When the vessel 50 is sufficiently filled, valves 52a and 53a are closed. Gas pressures between the vessels 50 and 50' are thereupon equalized by opening valve 71a in the connection 71. Most of the gas in vessel 50' at a pressure above that in vessel 50 now passes through the connection 71, into the vessel 50 and bubbles through the liquid therein. Since this liquid was admitted into vessel 50 at a lower pressure than the pressure in vessel 50', the condensation point temperature of the gas material is higher than the temperature of the liquid, so that heat exchange with condensation of part of the gas results. Upon the closing of valve 71a, the liquid may be transferred with gas displacement into the converter 54. Accordingly, valve 59a is opened. Liquid now passes through the connection 59 into the converter 54 after gas at higher pressure has passed upward through the connection 59 into the vessel 50 through the liquid therein until the pressures equalize. Upon equalization, it is desired to effect the rapid dropping of the liquid material from the vessel 50 into the converter 54; this is accomplished by opening valve 54a, the gas remaining in the converter being displaced upward through connection 58. Since it is advantageous to start filling the vessel 50' while vessel 50 is discharging, this would be done so that vessel 50' is ready to deliver liquid into converter 54' upon the completion of the discharge of vessel 50.

When the exchange of gas and liquid between vessel 50 and converter 54 has been completed, cross-equalization of pressures between the converters 54 and 54' is effected before discharging the converter 54 to the coils 62. Accordingly, valve 70a is opened while valves 58a, 59a are closed. Gas at a pressure higher than that in converter 54 then passes from the converter 54' through the conduits 59', 60, 68, the regenerator pass 66, conduits 69, 70 and 59, into converter 54 with consequent elevation of temperature and boiling point of the liquid in the converter and partial condensation of gas in the liquid. Heat is transferred from the gas to the heat storage agent 67 in the regenerator which was cooled by a previous discharge. Such heat extraction enables a lower equalization pressure to be attained. As soon as a desired equalization is accomplished valve 70a is closed. The warming of converter 54 by the heat transferred thereto from bath 57 causes the warming of the gas material within the basket 56, with consequent expansion of the gas material until there is an overflow passage of the gas material through perforations 56a, provided customarily about the top of the basket 56 to provide communication with the clearance space between the basket and the wall of the pressure vessel. When this overflow takes place, a relatively rapid building up of pressure ensues.

When the pressure in converter 54 exceeds that of the receiving devices coupled to the discharge of the heating coils 62, valve 61a is opened and flow of gas material from the basket space of converter 54 occurs through conduits 59, 60, 61, regenerator pass 64, and heating coils 62. The material first discharged contains a quantity of useful refrigeration which is given up to the storage agent 67. When discharge of gaseous material from converter 54 has been completed, the converter 54' would normally be filled with liquid dropped from vessel 50'. As soon, therefore, as the discharge from converter 54 ceases, valves 61a, 59b and 58b are closed and valve 70b opened. If, however, the gas discharged from a converter becomes too warm to transfer further refrigeration in the regenerator, valve 61a is closed and valve 73a is opened and the discharge is completed with the regenerator by-passed. When a plurality of converters are thus alternately operated in parallel and discharged through a single regenerator, it is seen that the flow therethrough may be relatively continuous.

The diagram of Fig. 4 shows graphically the effect of the regenerator on the distribution of heat and internal energy in a cascade system. The large rectangle represents the system and the various streams entering and leaving indicate by their width the amount of heat or internal energy, flowing, the sum of the widths of the inflowing streams equalling the sum of the outflowing. The ratios of the various quantities represented are not exact but illustrate the general nature, the conditions met in practice varying greatly.

At the top left, the energy stream $a$ represents the internal energy entering with the liquid, it being assumed to be substantially zero in value and is taken as a datum level with respect to the other quantities shown as positive in value. Therefore, in width stream $a$ is shown as a line. On its way downward the liquid internal energy stream is first shown as augmented by a stream $b$ within the system from the right, which stream in width represents the sum of internal energy additions received from gas being condensed in accordance with the cascade principle and gas remaining in the initial transfer vessel. Next in order there follows a stream $c$ which enters from the left and represents the sum of all heat that inadvertently leaks into the system. Next, a relatively large stream $d$ is shown as entering from the left representing the heat addition of the warm converter required to generate gas pressure for forcing the liquid from the final transfer vessel. A part of this joins the energy stream downward while the major portion continues to the right at $e$ representing internal energy contained in the gas phase remainder of the final transfer vessel or converter and branches to form first a downward flowing stream $f$ representing heat energy abstracted therefrom by the regenerator and an upward flowing stream $g$ representing internal energy remaining after passing the regenerator. The heat held by the regenerator is shown turned back to join with the downward flowing main stream. After this, the heat input of the final heater is shown entering from the right at $h$ and joining the main stream which finally leaves at $k$. The major part of the internal energy flowing upward at $g$ is shown to branch to the left to form stream $b$ which joins the liquid internal energy inflow line $a$ and represents the sum of the cascade condensations and the gas remainder in the initial vessel, while a relatively small remainder $l$ continues upward and out at the upper left to indicate the internal energy contained in the blowdown.

Dotted lines have been added to show the effect of omitting the regenerator. It is seen that the amount of internal energy $g$ flowing upward is much increased which largely increases the blowdown loss $l$ while the discharge stream $k$ at the bottom is displaced to the left by an amount equal to the amount of the heat added by the regenerator represented by width $f$, which requires a corresponding additional amount of heat input $h'$ from the final heater.

From the above it is seen that the heat storage and exchanging device of the present invention functions in accordance with the well known principle of regeneration but accomplishes the new function of conserving the refrigerating effect of the liquid in the transfer vessels by rejecting heat acquired by the gas phase in a cascade system, employing it to reduce the heat input required of the receiving and heating device. This rejection of heat in consequence results in increased condensation of material from the gas phase into the liquid phase in the transfer vessels, thereby reducing the blowdown from the initial transfer vessel, which is desired.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. A method of utilizing refrigeration in a volatile liquid material discharged from a transfer vessel which comprises transferring the heat stored in a heat storage and exchanging device to said material while being discharged whereby to cool said device, and transferring heat from gas remaining after discharge to said device to be stored therein whereby the internal energy of said gas before subsequent discharge is reduced.

2. A method of utilizing refrigeration in a volatile liquid material discharged from a transfer vessel which comprises transferring refrigeration from said liquid material while being discharged to a heat storage and exchanging device thereby heating said material while storing refrigeration in said device, and transferring the refrigeration stored in said device to gas remaining after discharge of said liquid material for reducing the internal energy of said gas before subsequent return and discharge of the gas into liquid to effect recondensation.

3. A method of delivering charges of liquefied gas from a source of low pressure to a receiver at relatively high pressure by means of transfer vessels, which comprises transferring heat from gas remaining after a discharge of one charge to a heat storage and exchanging device, and then transferring said heat to gas material of another charge being discharged to said receiver.

4. A method of delivering charges of liquefied gas from a source at low pressure to a receiver at relatively high pressure by means of transfer vessels which comprises transferring heat from gas remaining after a discharge of one charge is completed to a heat storage and exchanging device when passing said gas to another transfer vessel, and transferring heat from said device to gas material being passed to said receiver.

5. A method of operating a liquid transfer system having vessels arranged in cascade, which comprises intermittently withdrawing a relatively cold liquid from a vessel under pressure in said system, conserving the refrigerating effect of said liquid in a heat storage and exchanging device while being withdrawn, withdrawing gas from another point of the system at a temperature materially above that of said liquid during the intervals when no liquid is withdrawn, and passing said gas through said storage device whereby the heat of said gas is absorbed by the refrigerating effect of said liquid.

6. A method of operating a liquid transfer system having vessels arranged in cascade, which comprises intermittently transferring liquid from a final vessel in said system to a receiving device under pressure, conserving the refrigerating effect of said liquid during said transfer in a heat storage and exchanging device, and during the intervals when no liquid is withdrawn passing gas material from another point in the system to a vessel thereof through said storage device, and causing the gas material to be cooled by said passage whereby the condensation thereof in said other vessel is increased.

7. A method of operating a liquid transfer system having vessels arranged in cascade, which comprises intermittently withdrawing relatively cold liquid from a final vessel of said system, conserving the refrigerating effect of said withdrawn liquid by passing the same through a heat storage and exchanging device, passing gas from another point in the system to another vessel thereof during the interval when no liquid is withdrawn, causing the gas to be cooled by said passage and absorb the refrigerating effect of said liquid, and finally condensing at least a portion of the gas in the vessel to which it is supplied.

8. A method of delivering gas material, that is received in the liquid phase and evolves a gas phase due to the addition of heat for effecting delivery into a receiver by self-compression, which comprises segregating bodies of liquefied gas, forcing a desired portion of one of said bodies into said receiver by the action of a force of internal origin, producing said force by causing expansion of said body by heating, and distributing portions of the internal energy of the gas remaining after discharge to said receiver, first to a heat storage body and thereafter among a plurality of other segregated bodies whereby a desired portion of the gas remainder is liquefied for use.

9. A method of transferring volatile material that has a gas phase evolved due to heat gained in the transfer from one vessel to another in cascade relation, which method comprises introducing a metered charge of material in the liquid phase into one vessel while another vessel contains material in the gas phase at a relatively high pressure, equalizing the pressures between said vessels while effecting condensation of gas material drawn from the high pressure vessel and passed into the low pressure vessel, interchanging under the influence of gravity the liquid and gas phases between said vessels, heating the liquid in said high pressure vessel by heat inflow through the walls thereof to increase the pressure of the gas material to a value exceeding that of the receiver, and discharging gas material from a point in said high pressure vessel located so that the coldest material will be discharged first.

10. A method of transferring volatile material that has a gas phase evolved due to heat gained in the transfer from one vessel to another in cascade relation, which method comprises introducing a metered charge of material in the liquid phase into one vessel while another vessel contains material in the gas phase at a relatively high pressure, equalizing the pressures between said vessels while effecting condensation of gas material drawn from the high pressure vessel and passed into the low pressure vessel, interchanging under the influence of gravity the liquid and gas phases between said vessels, heating the liquid in said high pressure vessel by heat inflow through the walls thereof to increase the pressure of the gas material to a value exceeding that of the receiver and discharging gas material from a point in said high pressure vessel located so that the coldest material will be discharged first, and recovering refrigeration from the material first discharged for use in aiding said condensation.

11. In a system of the character described, the combination with a plurality of transfer vessels adapted to transfer liquid from a region of low pressure to a region of high pressure, liquid receiving and vaporizing means associated with said transfer vessels, means for withdrawing and supplying material from the liquid phase of a vessel in said system to said receiving device at high pressure, a heat storage and exchanging device adapted to pass the material withdrawn and store a refrigerating effect thereof, and means for withdrawing gas from another portion of said system connected to said heat storage and exchanging device and arranged to cool the gas during withdrawal therethrough.

12. In a cascade system of the character described, the combination with a plurality of transfer vessels arranged to transfer liquid from a region of low pressure to a region at relatively high pressure, of a liquid receiving and vaporizing device having a withdrawal connection connected to a vessel adapted to discharge when under relatively high pressure, a two-pass heat storage and exchanging device having one pass interposed in said liquid withdrawal connection, and a gas withdrawal connection communicating through the second pass of said heat exchanging device from another point in said system to a vessel in which condensation of material in the gas phase is to be effected 13. In a cascade system of the character described, the combination with a plurality of vessels arranged to be subject to relatively high pressures and to hold material in both liquid and gas phases, of gas passage means for effecting the transfer of internal energy from gas contained in one vessel to liquid contained in another vessel at a lower pressure, a heat storage and exchanging device interposed in said gas passage means, and means for withdrawing material from the liquid phase of a selected one of said connected vessels including a passage in said storage means whereby heat in the gas passed through said connection is absorbed and then transferred to and carried away by the material withdrawn.

14. In a cascade system of the character described, the combination with a plurality of vessels arranged to be subject to relatively high pressures and hold material in both liquid and gas phases, of gas passage means for effecting thermal contact of gas of one vessel with liquid of another vessel, a liquid phase withdrawal connection for withdrawing material selectively from said connected vessels, and a two-pass heat storage and exchanging device having one pass interposed in said gas passage means and the other pass in said liquid phase withdrawal connection.

15. In a cascade system of the character described, the combination with a plurality of vessels arranged to be subject to relatively high pressures and hold material in both liquid and gas phases, of a connection for equalizing the gas pressures between a pair of vessels, a liquid phase withdrawal connection for withdrawing material selectively from the liquid phase of said connected vessels, a two-pass heat storage and exchanging device having one pass interposed in said gas equalizing connection and the other pass in said liquid phase withdrawal connection, and heating means arranged to receive the gas material of the liquid phase after passage through said heat storage means.

16. In a system of the character described, the combination with a plurality of warm converters comprising pressure vessels provided with exterior warming means and arranged for receiving and heating gas material and to be operated in parallel, of a plurality of means respectively in series with said pressure vessels for exchanging gas material in two phases with said vessels, means for receiving the heated gas material discharged from said vessels, and additional means associated with said vessels for transferring gas from one into another.

17. In a system of the character described, the combination with a plurality of warm converters comprising pressure vessels provided with exterior warming means and with a common discharge line and arranged for the receiving and heating of gas material and operated in parallel, of a plurality of transfer vessels connected respectively in series with said pressure vessels for exchanging gas material in two phases therewith, receiving means connected to said discharge line of said pressure vessels for receiving the heated gas material discharged, and additional means associated with said discharge line having countercurrent passages for absorbing and storing heat of gas material in the gas phase passing from one of said pressure vessels and transferring said heat to gas material passing from another of said pressure vessels.

18. In a system of the character described, the combination with a plurality of warm converters comprising pressure vessels provided with exterior warming means and with a common discharge line and arranged for the receiving and heating of gas material and operated in parallel, of a plurality of transfer pressure vessels corresponding in number to the warm converters, each being connected in series with one of said warm converters for exchanging gas material in two phases therewith, receiving means connected to said discharge line of said pressure vessels, cross-connections associated with said warm converters for equalizing the pressure therein by the transference of gas material in the gas phase from each converter into another, additional cross-connections associated with said transfer vessels for equalizing pressures and transferring gas material in the gas phase from each of said transfer vessels to another, and additional means associated with said discharge line and arranged for the counter passage of gas material therethrough and having a heat absorbing and storing agent whereby gas material in the gas phase may be passed therethrough in one direction in contact with said agent from one of said pressure vessels at high pressure and gas material from another pressure vessel at lower pressure passed therethrough in contact with said agent in the opposite direction.

19. In a system of the character described, the combination with a plurality of warm converters comprising pressure vessels provided with exterior warming means and with a common discharge line and arranged for the receiving and heating of gas material and operated in parallel, of a plurality of transfer vessels corresponding in number to said warm converters and respectively connected in series therewith, said connections including channels for the separate exchange of material in the gas and liquid phases, heat applying and receiving means connected to said converters for receiving the heated gas material discharged therefrom, a heat absorbing and storing device interposed in said discharge line and arranged to have a counter passage for gas material in the gas phase, cross-connections associated with said converters for transferring gas material in the gas phase from any of said converters into another, said heat absorbing and storing device having its counter passage connected in said cross-connections, and additional cross-connections associated with said intermediate vessels for transferring gas material in the gas phase from any of said intermediate vessels to another.

20. In a system of the character described, the combination with a plurality of warm converters comprising pressure vessels provided with exterior warming means and with a common discharge line and arranged for the receiving and heating of gas material and operated in parallel, of means for receiving material discharged from said vessels, means for storing refrigeration associated with said discharge line for conducting the material discharged and in heat exchanging relation with said material, and additional means for conducting gas in heat exchanging relation with said refrigeration storing means from one vessel to another.

21. In a system of the character described, the combination with a plurality of warm converters comprising pressure vessels provided with exterior warming means and with a common discharge line and arranged for the receiving and heating of gas material and operated in parallel, of means for receiving material discharged from said vessels, an agent disposed for storing refrigeration, discharge means for conducting material selectively from the lowest portion of said vessels in heat exchanging relation with said refrigeration storing agent to said receiving means, and additional means for conducting gas in heat exchanging relation with said refrigeration storing agent from one vessel to another.

22. In a cascade system for transferring a volatile liquid material from a supply vessel where it is held at a relatively low pressure to a receiving device under a relatively high pressure, the combination of a plurality of transfer vessels connected in series for holding charges of said material and gas evolved therefrom due to heat gained on discharge from said vessels, means for metering charges of said material and conducting them successively from said supply vessel into an initial one of said transfer vessels, means associated with certain of said vessels for preserving the refrigeration of said charges, means for equalizing pressure of material in adjacent vessels in series by the passage of gas from the vessel at higher pressure through liquid in the other, means for exchanging material in the gas phase with material in the liquid phase between said vessels, means for discharging a desired major portion of said charges to said receiving device, and means for applying heat to said material during said discharge, means for discharging material from the liquid phase in a final vessel of a series, and a material for storing refrigeration arranged to absorb refrigeration from said material discharged from the liquid phase and transfer refrigeration to gas passing from said final vessel to an adjacent vessel.

LEO I. DANA.